(12) United States Patent
Fang et al.

(10) Patent No.: US 7,003,189 B1
(45) Date of Patent: Feb. 21, 2006

(54) OPTICAL FIBER PROTECTION SWITCH

(75) Inventors: Xiaojun Fang, Burlingame, CA (US);
Li-Ping Chen, Foster City, CA (US);
Boris Faer, Belmont, CA (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 10/838,684

(22) Filed: May 4, 2004

Related U.S. Application Data

(63) Continuation of application No. 10/295,183, filed on Nov. 15, 2002, now Pat. No. 6,771,849, which is a continuation of application No. 09/207,064, filed on Dec. 7, 1998, now Pat. No. 6,504,963.

(51) Int. Cl.
*G02B 6/26* (2006.01)
(52) U.S. Cl. ....................................................... 385/16
(58) Field of Classification Search ................. 385/16, 385/24, 19; 398/1–37; 370/221–224, 219, 370/907, 535–538
See application file for complete search history.

(56) References Cited

U.S. PATENT DOCUMENTS

| | | | |
|---|---|---|---|
| 5,003,531 A | | 3/1991 | Farinholt et al. |
| 5,179,548 A | | 1/1993 | Sandesara |
| 5,442,623 A | | 8/1995 | Wu |
| 5,600,631 A | | 2/1997 | Takatori et al. |
| 5,815,490 A | * | 9/1998 | Lu ............................. 370/223 |
| 6,049,525 A | | 4/2000 | Takahashi et al. |
| 6,130,764 A | * | 10/2000 | Taniguchi ...................... 398/1 |

OTHER PUBLICATIONS

Pearson, Gary; Koehler, Steffen, "Wavelength Division Multiplexing and OPtical Networking in the Local Exchange Market," Telesis Technologies Laboratory, an SBC Communications Company, pp. 63-73.
Wu, Tsong-Ho; Way, Winston I.; "A Novel Passive Protected SONET Bidirectional Self-Healing Ring Architecture," IEEE Journal of Lighwave Technology, vol. 10, No. 9, Sep., 1992.
Mechanical Fiberoptic Switch (MFSW) Application Note, E-TEK-AN-096640, Document #D3-12-37-000, MFSW Product Application Bulletin, Dec., 1996.
Manchester, James; Bonenfant, Paul; "Fiber OPtic Network Survivability: SONET/Optical Protection Layer Interworking," Bellcore, Red Bank, NJ, pp. 907-918.
Arecco, Fulvio; Casella, Federica; et al., "A Transparent, All-Optical Metropolitan Network Experiment in a Field Environment: The "PROMETEO" Self-Healing Ring," Journal of Lightwave Technologu, vol. 15, No. 12, Dec. 1995 IEEE.

* cited by examiner

*Primary Examiner*—Tu T. Nguyen

(57) ABSTRACT

An optical fiber protection switch that performs automatic protection switching. The optical fiber protection switch performs span and ring switching at the optical layer, thereby negating the need for SONET ADMs to perform the switching at the SONET layer. The optical fiber protection switch includes span switches and ring switches arranged to provide span and ring switching, respectively. The span switches and ring switches are implemented using 2×2 optical switches, for a total of eight 2×2 optical switches in the optical fiber protection switch. The system described herein may utilize SONET terminals and/or ATM switches in a WDM environment to support capacity increases while providing the ring and span switching functionality. A network switching element providing transparent, self-healing optical 4-fiber BLSR (OBLSR/4) is realized by using the optical fiber protection switch described herein.

20 Claims, 8 Drawing Sheets

OPTICAL FIBER PROTECTION SWITCH

RELATED APPLICATIONS

This application is a continuation of prior application Ser. No. 10/295,183, filed Nov. 15, 2002, now U.S. Pat. No. 6,771,849, entitled "OPTICAL FIBER PROTECTION SWITCH," which is a continuation of prior application Ser. No. 09/207,064, filed Dec. 7, 1998, now U.S. Pat. No. 6,504,963, entitled "OPTICAL FIBER PROTECTION SWITCH," and which are incorporated by reference into this application.

BACKGROUND OF THE INVENTION

A. Field of the Invention

The present invention relates to optical communication networking devices. More particularly, the invention relates to an optical fiber protection switch to protect optical networks, and specifically, wavelength division multiplexed optical 4-fiber Bi-Directional Line Switched Ring (BLSR) Networks.

B. Description of the Related Art

1. Optical Networking

Synchronous optical networking (SONET) and synchronous digital hierarchy (SDH) are standardized optical digital transmission systems that are used, respectively, in North America and internationally. SONET networks typically use synchronous add/drop multiplexers (ADM) to add and/or drop asynchronous DS-n signals onto the links. The ADM devices also re-route signals to avoid faulty communication links. This is referred to as span and ring switching.

2. Span Switching and Ring Switching

Span switching and ring switching are mechanisms to re-route traffic over optical networks. A ring is a network configuration that allows signal path redundancy between nodes on a network by interconnecting the nodes in a loop, or ring. In a four-fiber ring, the nodes are connected with a pair of working fibers creating a bi-directional communication path, and a pair of protection fibers creating a second bi-directional communication path to be used as protection for the working ring. The working and protection fibers connect each node to the two adjacent nodes in the ring topology.

Span switching is performed between two nodes to re-route working traffic over the protection fiber in the event of a fiber failure on the working ring. The failure may be due to a fiber cut or signal degradation due to other equipment failures. The working traffic is placed on the protection fiber by the transmitting stations, then re-routed to the working fiber/ring at the receiver, thereby bypassing the failed fiber/equipment. The working traffic from the failed fiber span is thus re-routed to the protection fiber span.

Bi-directional line switched ring (BLSR) is a bi-directional ring that protects against fiber failures that are more severe—such as fiber bundle cuts—where the failure occurs in both working fibers and both protection fibers between two nodes on the ring. In the event of a fiber bundle cut between two adjacent nodes, the working ring traffic is re-routed in the reverse direction along the protection fiber ring by the nodes on either side of the fiber bundle cut. Automatic protection switching (APS) may be used to perform the ring switch automatically upon signal loss.

Current SONET BLSR uses a SONET add-drop multiplexer (ADM) as the line termination equipment, and APS performs the span or ring switch when transmission failure occurs within the ring. In the SONET BLSR architecture, the SONET ADM performs span and ring switching by bridging the working line with the protection line, thereby protecting the working traffic.

3. Wavelength Division Multiplexing

The demand for bandwidth in the transport network has been increasing at an exponential rate. This aggressive demand has fueled the rapid deployment of wavelength division multiplexing (WDM) in the network to alleviate fiber constraints. WDM may be viewed as a parallel set of optical channels, each using a slightly different light wavelength, but all sharing a single transmission medium. WDM systems have the advantage of increasing the capacity of existing networks without the need for expensive re-cabling.

In the current deployment scenario, a single, multi-wavelength WDM system transports multiple, concentric, single-wavelength SONET rings. SONET ring protection is typically accomplished by ADMs, providing both span and ring protection switching. Capacity increases on the WDM ring are typically accomplished by building a new SONET ring, which includes SONET ADMs to support the protection requirements.

SUMMARY OF THE INVENTION

An optical fiber protection switch that performs automatic protection switching is provided. The optical fiber protection switch performs span and ring switching at the optical layer, thereby negating the need for SONET ADMs to perform the switching at the SONET layer. The system described herein may therefore utilize SONET terminals and/or ATM switches in a WDM environment to support capacity increases while providing the ring and span switching functionality.

The optical fiber protection switch includes a span switch and a ring switch arranged to provide span and ring switching, respectively. The span switch and ring switch are each implemented using four 2×2 optical switches, for a total of eight 2×2 optical switches in the optical fiber protection switch.

A network switching element providing transparent, self-healing optical 4-fiber BLSR (OBLSR/4) is realized by using the optical fiber protection switch described herein.

BRIEF DESCRIPTION OF THE DRAWINGS

The foregoing and other objects, features and advantages of the present invention will be more readily appreciated upon reference to the following disclosure when considered in conjunction with the accompanying drawings, in which.

DETAILED DESCRIPTION OF THE PREFERRED EMBODIMENT

Figure 1:
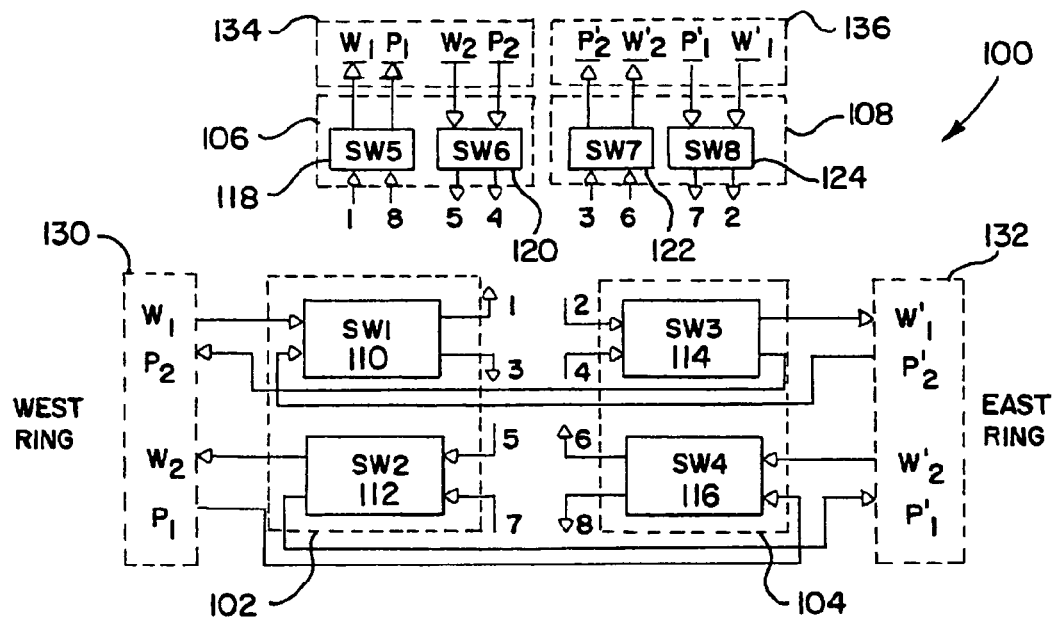
FIG. 1 depicts a preferred embodiment of the optical fiber protection switch (OPSW)

The optical fiber protection switch 100 is designed to perform 4-fiber BLSR protection switching to bridge traffic between working fibers and protection fibers. The structure and interconnection of the optical fiber protection switch (OPSW) 100 is shown in FIG. 1, where eight 2×2 optical switches 110, 112, 114, 116, 118, 120, 122, and 124, are used. The optical switch 100 includes a west ring switch 102, an east ring switch 104, a west span switch 106 and an east span switch 108. As indicated in FIG. 1, the interface between the ring switches 102, 104 and the span switches 106, 108, is shown with the aid of the numerical references "1" through "8" (e.g., point "1" on the west ring switch 102 connects to point "1" on the west span switch 106, etc.).

The west ring switch 102 includes a first optical switch 110 and a second optical switch 112. The east ring switch 104 includes a third optical switch 114 and a fourth optical switch 116. The west span switch 106 includes a fifth optical switch 118 and a sixth optical switch 120. The east span switch 108 includes a seventh optical switch 122 and an eighth optical switch 124. The optical switches 110–124 are 2×2 optical switches. In a first switching state of the 2×2 optical switches the two inputs are connected to the two outputs. For example, in FIG. 1, the input from the W1 fiber is connected to output "1" and the input from the P'2 fiber is connected to output "3". In a second switching state of the 2×2 optical switches, the inputs are redirected to the other output, resulting in a cross-connection. For example, the input from the W1 fiber is connected to output "3" and the input from the P'2 fiber is connected to output "1".

Switches 110–124 are preferably mechanically operated optical switches. While mechanical switches tend to be somewhat slower than some electronic switches and have a shorter mean-time-to-failure, they are generally less expensive and yet provide effective channel cross-talk isolation. Mechanical fiber optic switches typically utilize solenoid-activated moving prisms or moving mirrors to direct the optical signals. Switching speed is on the order of 20 ms or faster, and insertion loss and PDL are low. The switches preferably include a feedback output by which the state of the switch may be determined. Suitable optical switches are the MFSW switch available from E-Tek, Inc. of 1865 Lundy Avenue, San Jose, Calif. 95131 or the SW, SL, or SR series switches from JDS FITEL, Inc. 570 West Hunt Club Road, Nepean, Ontario, K2G 5W8 Canada.

$W_1$, $W_2$, and $W_1'$, $W_2'$ are working fibers on the west and east sides of the switch, respectively, and $P_1$, $P_2$, and $P_1'$, $P_2'$ are protection fibers on west and east sides of the node, respectively. The west and east ring interface ports 130 and 132, respectively, connect the optical switch 100 to the optical ring working and protection fibers. The west and east client equipment interface ports 134 and 136, respectively, are depicted on the topside of optical switch 100, and allow connection of the optical switch to client equipment.

There are two functional layers in the optical protection switch 100, ring switching and span switching. Under normal operating conditions, each signal at the west ring interface port 130 of the OPSW 100 is interconnected to the corresponding underlined port of the west client equipment interface port 134 of the OPSW 100 through the internal 2×2 switches of the west ring switch 102 and west span switch 106. For example, W1 of ring interface port 130 is connected to W1 of client equipment interface port 134 by way of SW1 110 and SW5 118.

Each span switch 106, 108 includes a 2×2 switch for a receive fiber pair and one for a transmit fiber pair (a "fiber pair" is one working fiber and its associated protection fiber, e.g., the pair W1, P1, which, incidentally, is also referred to as the pair W1', P1' with respect to an adjacent OPSW). For example, span switch 106 includes SW5 118 that carries receive signals nominally received from the W1 P1 fiber pair to equipment connected to port 134. Span switch 106 also includes SW6 120 that accepts signals from the equipment connected at port 134, which are nominally directed to the W2 P2 fiber pair. Of course it is recognized that the actual origin and destination of such transmit and receive signals is dependent upon the switching states of the 2×2 optical switches.

Each ring switch is interconnected to fibers at both ports 130 and 132. Ring switch 102 is connected to W1 and W2 of port 130 and to P1' and P2' of port 132. Ring switch 104 is connected to W1' and W2' of port 132 and P1 and P2 of port 130. Note that ring switches 102 and 104 do not necessarily contain a transmission medium or otherwise connect to fibers other than those that connect to the 2×2 optical switches within the ring switches. Specifically, for example, ring switch 102 need not connect to the P2 fiber, even though FIG. 1 depicts the lower output of SW3 114 of ring switch 104 passing through ring switch 102 en route to west ring port 130. The connections depicted in the drawing are merely for convenience, and in the physical embodiment of OPSW 100, the lower output of ring switch 104 connects directly to fiber P2 of west port 130, bypassing ring switch 102. The other similar connections between the west ring switch 102 and the east protection fibers bypass the east ring switch 104, and those between the east ring switch 104 and the west protection fibers bypass the west ring switch 102.

Figure 2:
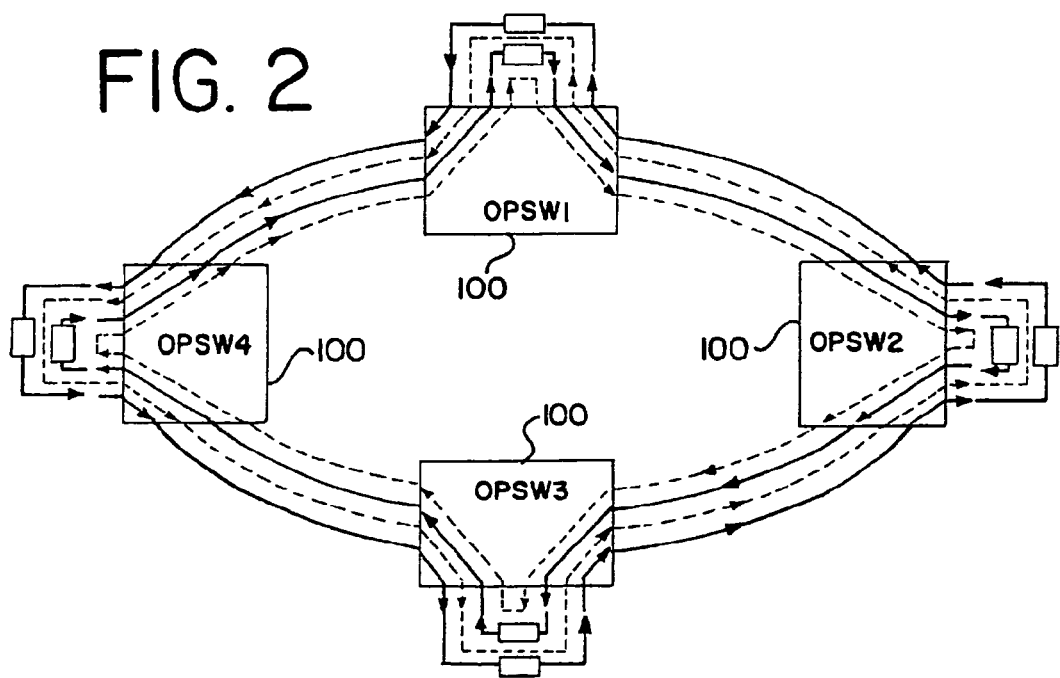
FIG. 2 depicts a preferred embodiment of the OPSW in a four-fiber BLSR in a normal switching condition.
Figure 3:
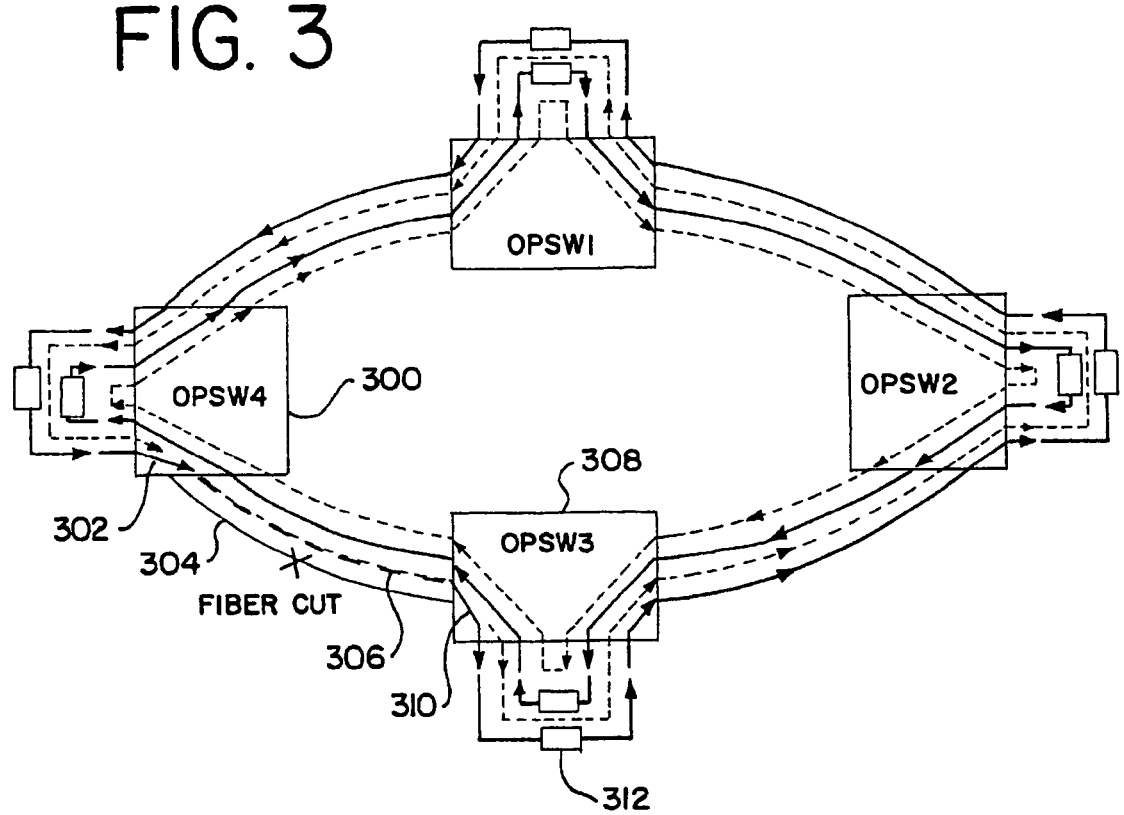
FIG. 3 depicts a preferred embodiment of the OPSW in a four-fiber BLSR in a span switching condition.
Figure 4:
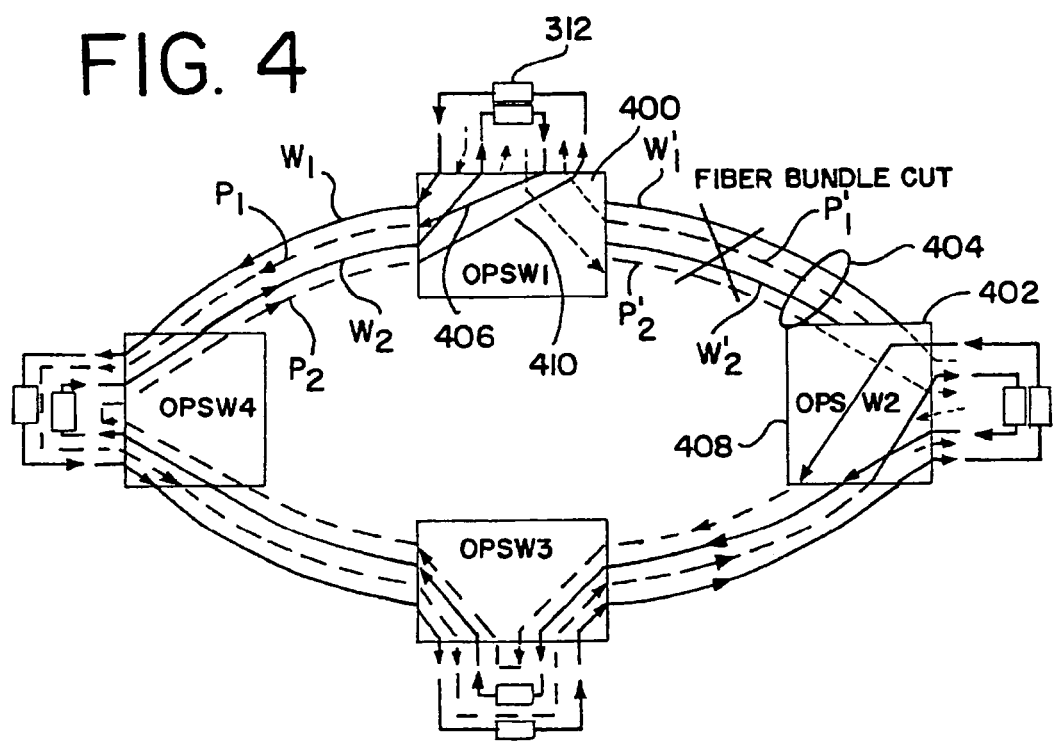
FIG. 4 depicts a preferred embodiment of the OPSW in a four-fiber BLSR in a ring switching condition.

FIGS. 2, 3, and 4 illustrate a four-node dense wavelength-division multiplexed (DWDM, or WDM) 4-Fiber Optical Bi-Directional Line-Switched Ring is used in here to illustrate operation of the protection switching of OPSW 100. Generally, the OPSW 100 accomplishes the signal re-direction of ring and span switching in a manner similar to that defined in SONET BLSR standard. Bellcore Document GR-1230-CORE sets forth the ring and span switching of SONET BLSR, and is incorporated by reference herein. A significant difference between the SONET BLSR and the optical fiber BLSR (OBLSR) implemented by OPSW 100 is that the protection bridging is accomplished in the optical domain by the OPSW 100 in the optical BLSR network proposed herein, rather than in the SONET add-drop multiplexer in the SONET BLSR standard. Similar to the SONET BLSR, both optical span switching and optical ring switching can be supported by the optical BLSR. FIG. 2 shows the working traffic flow under normal conditions, where heavy lines indicate the working traffic.

The OPSW implements both types of protection switching: ring switching and span switching. Ring switching is implemented when a bundle failure occurs (e.g., all four fibers are cut), and span switching is implemented when a working fiber cut occurs. The terms "fiber cut" or "fiber failure" are used here to refer generally to a connection failure that may be caused by fiber break/cut, line fiber amplifier failure, or other type of fault resulting in a degraded or unacceptable connection. The OPSW performs automatic protection switching when loss of signal indication is observed (this can be achieved by many ways such as pilot tone, use of Optical Service Channel, etc.).

When a fiber failure occurs, the optical protection switch 100 will reroute the multi-wavelength working traffic to the protection fiber by changing its internal switch connections. With reference to FIG. 3, OPSW4 300 re-directs working traffic, as shown by arrow 302, from the working fiber 304 to the protection fiber 306. OPSW3 308 redirects the traffic, as indicated by arrow 310, prior to reaching the terminal equipment, or traffic access equipment 312.

The optical protection switch 100 can support optical ring switching as shown in FIG. 4. In the event that the fiber bundle 404 connecting OPSW1 400 and OPSW2 402 fails, OPSW1 400 and POSW2 402 redirect the signals as indicated. Traffic received by OPSW1 400 on the west W2 fiber would normally be sent out on the east W2' fiber, but is instead redirected to the west-bound P1 fiber as shown by arrow 406. The traffic similarly redirected by OPSW2 402 (shown by arrow 408) is received by OPSW1 400 on the west P2 fiber. OPSW1 400 redirects this traffic to the east side of the traffic access equipment 312 as shown by arrow 410 so that it may be processed as if it had been received directly from OPSW2 402 over the W1' fiber. Thus it may be seen that the protection fibers are used to re-route the working traffic and effectively replace the failed working fibers in bundle 404.

Figure 5:
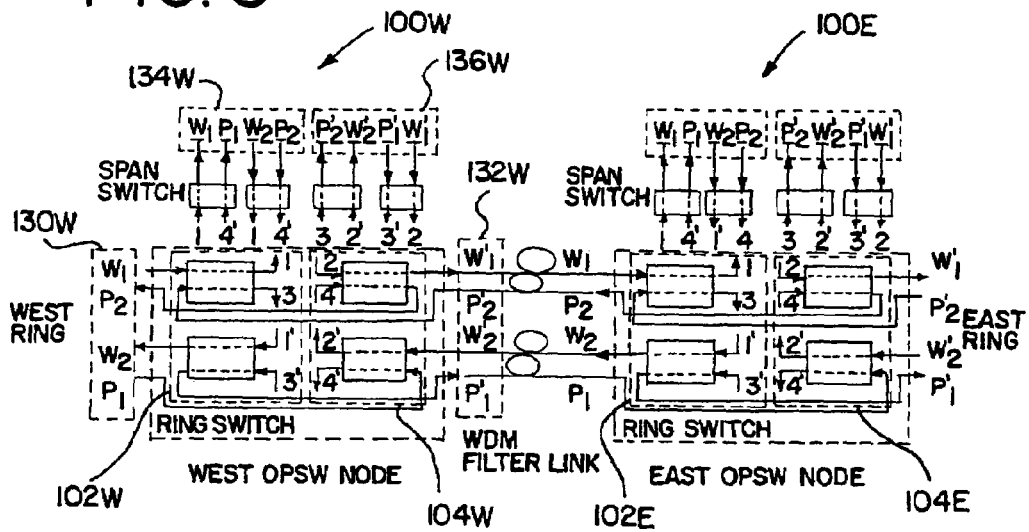
FIG. 5 depicts the internal switching states of two interconnected OPSWs under normal switching conditions.

In FIGS. 5–8, the components of OPSWs 100W (west) and 100E (east) will be referred to by the same numbering system as in FIG. 1, with a W or E appended when necessary to differentiate between the west and east OPSW switches 100W and 100E. FIG. 5 depicts the states of the internal switches of two interconnected OPSWs 100W and 100E. The span switches 106, 108 and ring switches 102, 104 are shown in a first switching state. That is, the signal paths from the respective input/output ports 130, 132, 134 and 136, to the interface between the ring and span switches are not redirected by the span and ring switches. The states of the internal 2×2 switches for each OPSW 100W, 100E which correspond to the first switching state of the ring and span switches may also be seen in FIG. 5. Each 2×2 optical switch is preferably in an un-switched state allowing signals to pass through without redirection. The remainder of the ring network is not shown in FIGS. 5–8 because only the two switches adjacent to the failed link will switch, while the other nodes remain in the first switching state.

Figure 6:
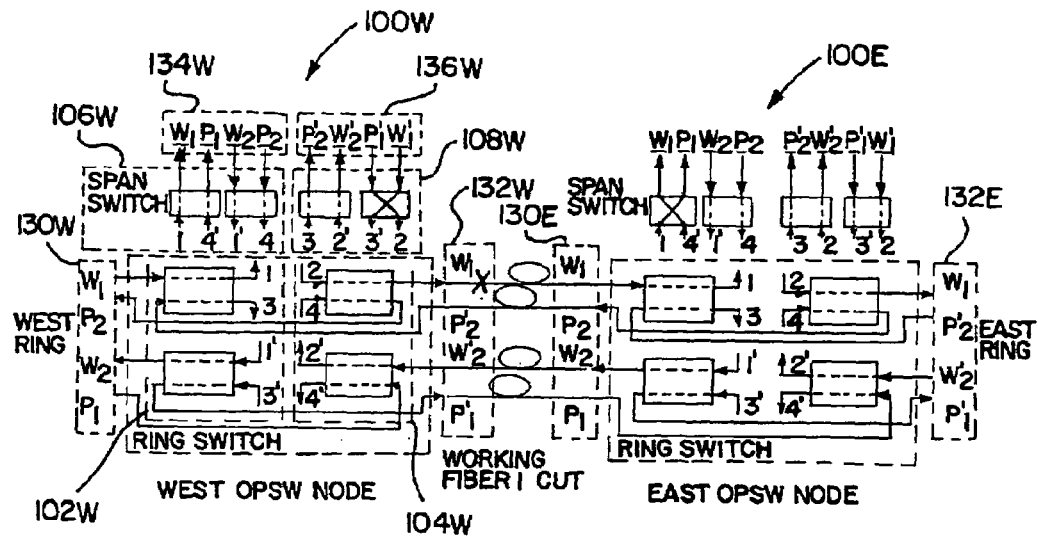
FIGS. 6 and 7 depict the internal switching states of two interconnected OPSWs under span switching conditions.
Figure 7:
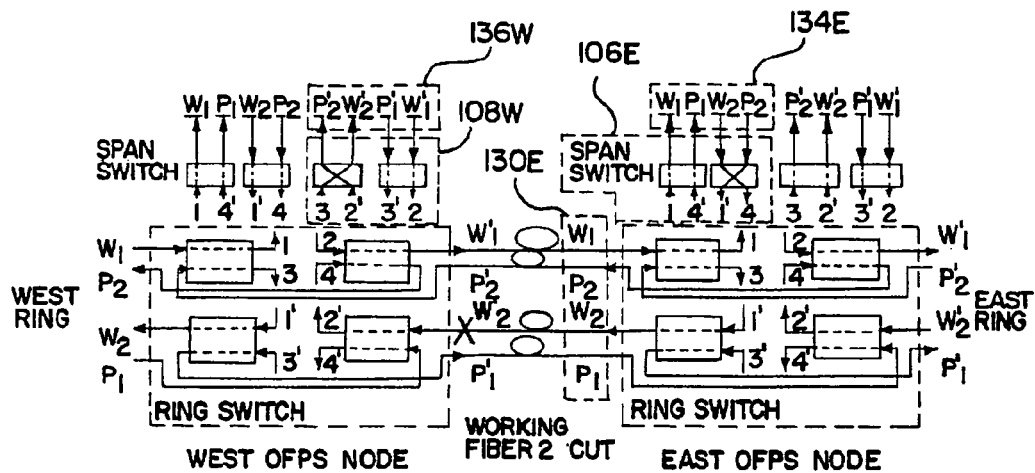

A second switching state of the span switches 106, 108 is shown in FIGS. 6 and 7. The second switching state redirects the signal from the working fiber to the protection fiber, or vice-versa. This occurs when there has been a single working fiber failure. In FIG. 6, the east W1 (W1') fiber is inoperative, hence span switch 136W of OPSW 100W redirects the working traffic received on W1' of port 136W to ring switch 102W. Ring switch 102W then directs the traffic to the protection fiber P1' through port 132W. In OPSW 100E, on the east side of the fiber failure, the working traffic received on the protection fiber P1 of port 130E passes through ring switch 104E to span switch 106E. Span switch 106E redirects the traffic to the W1 fiber of port 134E so that traffic access equipment 312 (not shown) connected to ports 134E can process it as normal working traffic.

With reference to FIG. 7, the working fiber W2 is in a failure condition, and span switches 136W and 134E redirect the working traffic around the failed fiber, using the protection fiber P2. The signal to be transmitted from 100E to 100W containing the working traffic is received from traffic access equipment 312 (not shown) on port 134E on the W2 fiber. As shown in FIG. 7, span switch 106E redirects the working traffic to the protection fiber P2 at port 130E by redirecting the signal to ring switch 104E instead of ring switch 102E.

Figure 8:
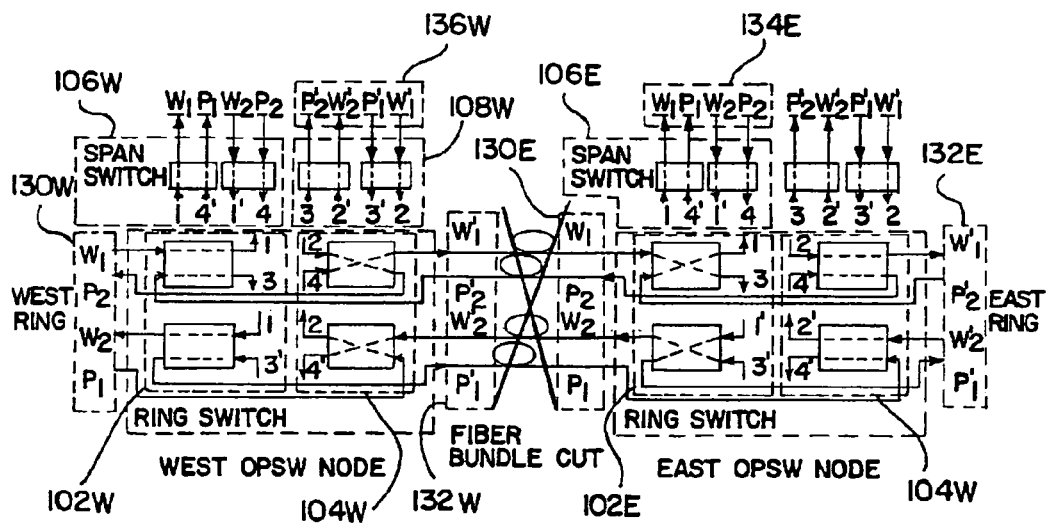
FIG. 8 depicts the internal switching states of two interconnected OPSWs under ring switching conditions.

In the ring switching operation depicted in FIG. 8, the working traffic between two isolated nodes is redirected in the opposite direction over the protection fibers. Ring switch 104W receives working traffic intended for OPSW 100E from span switch 108W on the line indicated by '2' at the top left of ring switch 104W. Ring switch 104W redirects this traffic out to P2 of port 130W. The signal passes around the ring over the P2 protection fiber and is received by OPSW 100E at the P2' fiber of port 132E. The signal is directed to the W1 fiber of port 134E by ring switch 102E (via span switch 106E). In this manner, the traffic access equipment 132 connected to port 134E may process the working traffic in the normal fashion. The working traffic headed from OPSW 100E to OPSW 100W is similarly redirected by ring switch 102E over protection fiber P1 to ring switch 104W, which then redirects the working traffic to the W2' fiber of port 108W for processing.

Figure 9:
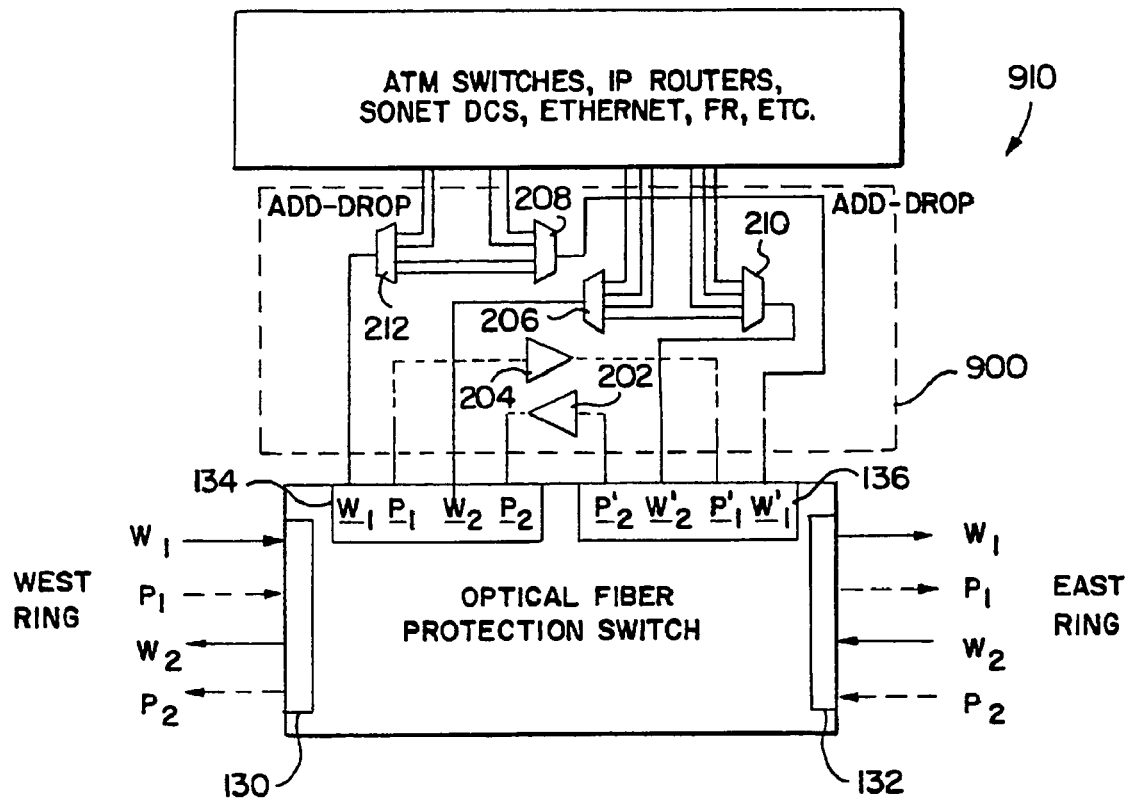
FIG. 9 depicts a preferred embodiment of the optical line termination equipment (OLTE)

The OPSW 100 is shown in FIG. 9 in a preferred configuration appropriate for use as an optical line termination equipment (OLTE) 910 in a WDM four-fiber BLSR network. With reference to FIG. 9, the working and protection ring fibers are connected to the west and east ring interface ports 130 and 132, respectively. The protection interface ports $P_1$, $P_1'$, $P_2$, and $P_2'$ on the top of the switch are interconnected with each other through optical regenerators (optical amplifiers) 202 and 204. Working traffic from $W_1$, $W_1'$, $W_2$, and $W_2'$ appearing at the client equipment interface ports 134, 136 are connected with wavelength multiplexers (MUX) 206, 208 and demultiplexers (DEMUX) 210, 212. The multiplexers and demultiplexers 206–212 provide access to terminal equipment such as ATM switches, IP routers, SONET DCS, ethernet networks, frame relay (FR), etc. Each wavelength of the WDM signal, or each channel, is connected either to a client transceiver or is directly passed from DEMUX to MUX (DEMUX 212 to MUX 208, or DEMUX 210 to MUX 206). In this way, all optical signals are transported, added, or dropped, through the WDM BLSR network.

Figure 10:
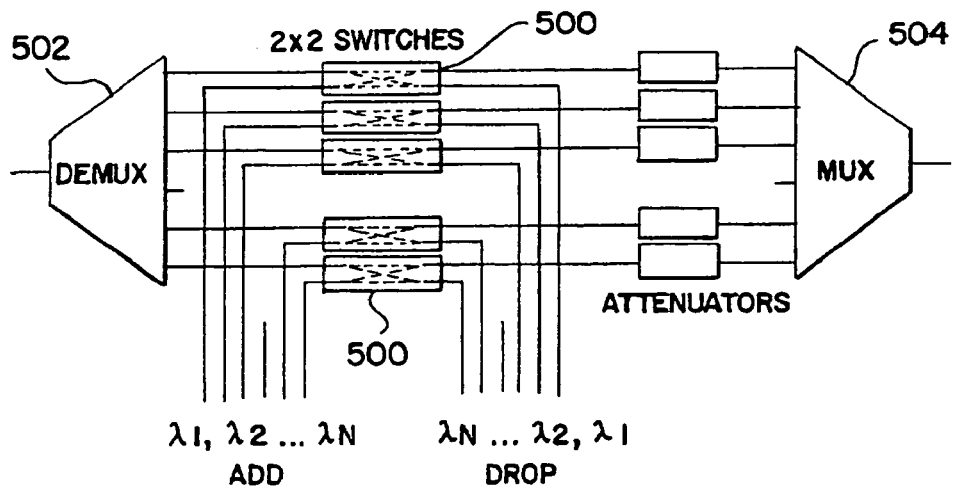
FIG. 10 depicts an optical add-drop multiplexer available from JDS Fitel.

The OCM 900 of FIG. 9 may have dedicated add-drop functionality, or may be implemented on a configurable optical add drop multiplexer (COADM), such as that available from JDS Fitel. The COADM depicted in FIG. 10 selectively adds and drops wavelength channels from a DWDM multi-channel stream using 2×2 optical switches 500 placed between demultiplexers 502 and multiplexers 504. Each 2×2 switch may simultaneously drop a channel on a given wavelength and add a new channel of the same wavelength (or a different wavelength, provided there is no spectral conflict). The COADM is available in opto-mechanical and solid state switch versions.

Figure 11:
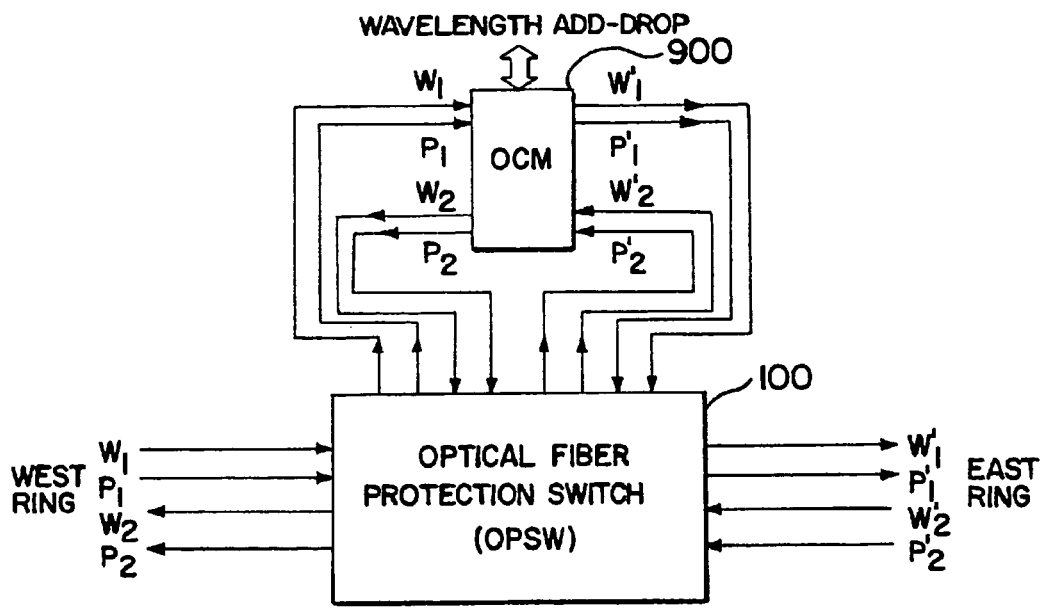
FIG. 11 depicts a block diagram of the OLTE, including an optical channel manager (OCM)
Figure 12:
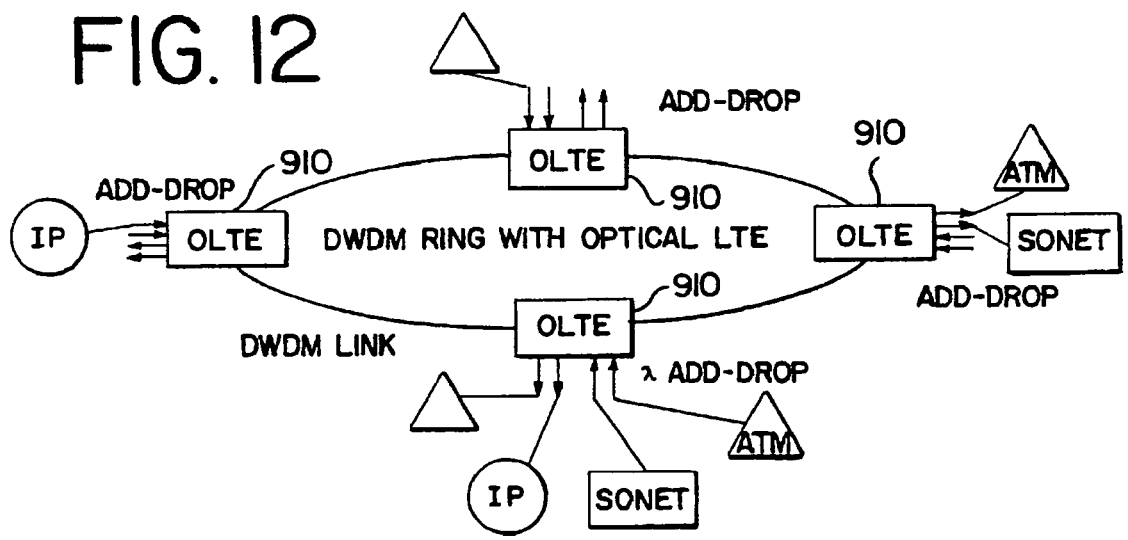
FIG. 12 depicts a preferred network configuration of the OLTE in a wavelength division multiplexed (WDM) BLSR.

The OLTE, therefore consists of the OPSW 100, and two optical channel managers (OCM) 900. The OCM provides traffic or channel access to the individual wavelengths in the WDM network. FIG. 11 depicts a block diagram of the OLTE, including the OCM 900 and the OPSW 100, while the overall network configuration is shown in FIG. 12.

Figure 13:
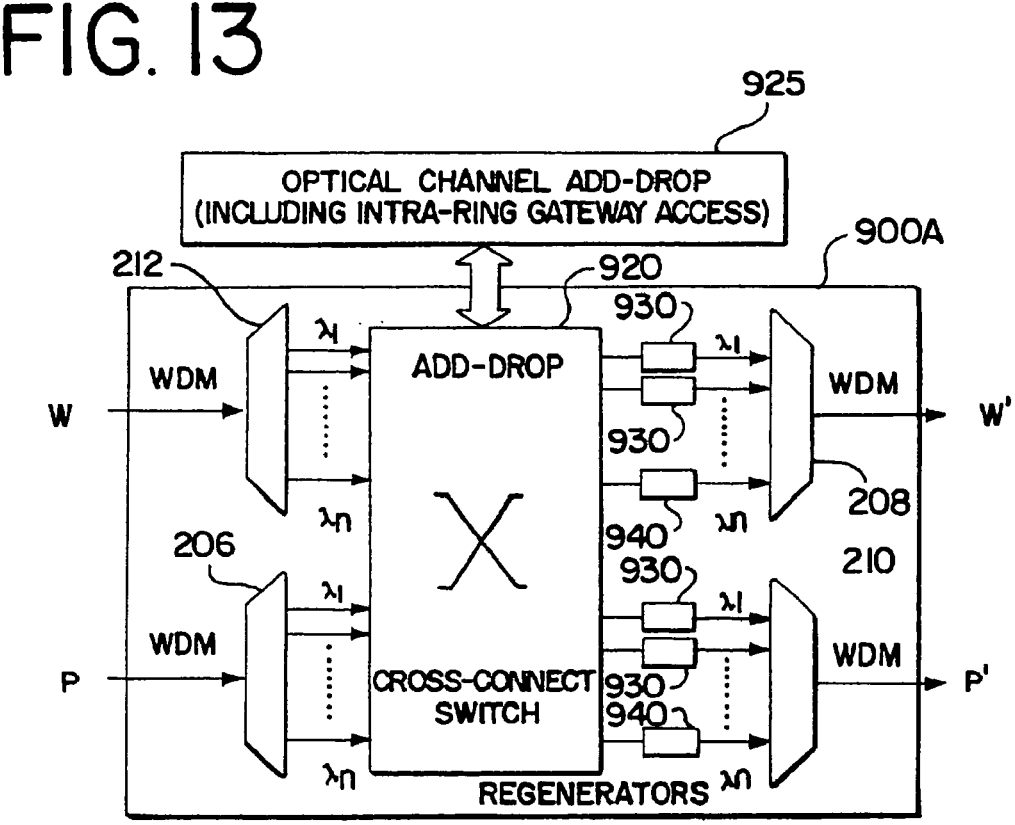
FIGS. 13 and 14 depict alternative preferred embodiments of the OCM.
Figure 14:
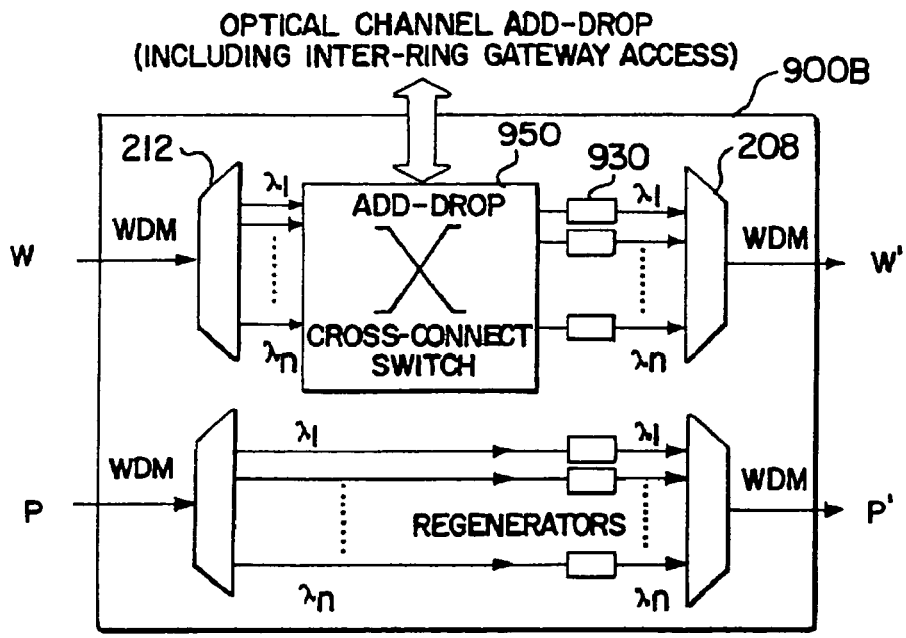

FIGS. 13 and 14 depict alternative preferred embodiments of the OCM. Note that for simplicity FIGS. 13 and 14 depict the components required for only one working fiber/protection fiber pair. It is understood that each OCM is capable of handling two working/protection fiber pairs. It is also understood that the OCM 900 may optionally include optical amplifiers 202, 204, which are also not depicted in FIGS. 13 and 14. FIG. 13 shows an optical channel manager OCM 900A having demultiplexers 212, 206, multiplexers 208, 210, and cross connect switch 920. The cross connect switch 920 is preferably an optical cross connect switch, but may alternatively be an electrical cross connect switch. Suitable optical cross connect switches are available from such manufacturers as NEC and Fujitsu. The cross connect switch also provides an interface 925 to terminal equipment that further processes the optical channels that are added or dropped by the switch 920.

The OCM 900A also includes regenerators 930, 940. The regenerators are capable of receiving signals over a broad spectrum and regenerate it at the desired wavelength. Suitable regenerators are available from Fujitsu. The regenerators receive the optical signal of a given wavelength and adjust the spectrum to occupy a desired wavelength. One function of the regenerators 930, 940 is to shift the optical signal from one wavelength to another. Each regenerator 930, 940 provides an optical signal output at a different wavelength such that the various outputs may be combined by multiplexer 208 (or 210) without interfering with each other. One or more regenerators 940 may be reserved as backup regenerators to be used in the event of failure of any other regenerator 930. The backup regenerators 940 may have an output at a predetermined wavelength, or alternatively, may include a tunable laser such that the backup regenerators 940 provide an output at any specified wavelength, preferably the same wavelength as the failed regenerator unit.

FIG. 14 shows an alternative embodiment of an OCM 900B. The OCM 900B is a simplifed version of OCM 900A in that only the working traffic is switched by cross connect switch 950, while the protection traffic is routed straight through the OCM 900B.

Figure 15:
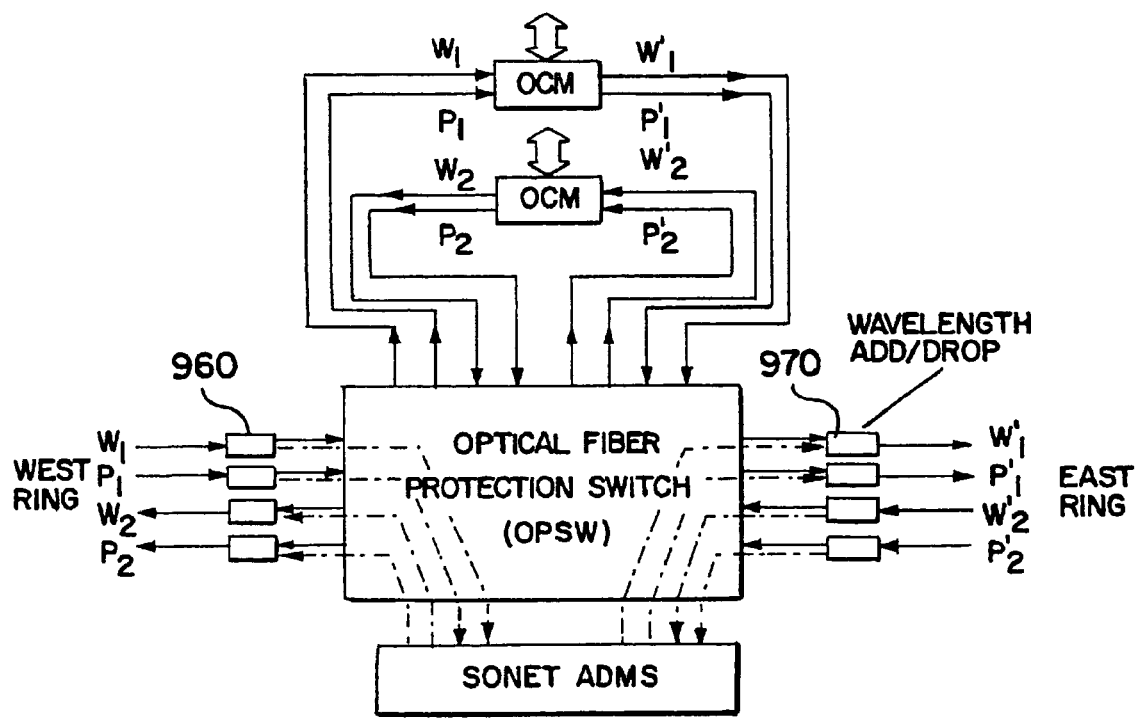
FIG. 15 demonstrates the compatibility of the OPSW/OLTE with current SONET networks.

FIG. 15 demonstrates the compatibility of the OPSW/OLTE with current SONET networks. The signals received on working and protection fibers pass through an optical wavelength drop switch 960 which extracts, or demultiplexes, the SONET channel to be processed independently. The SONET channel is then recombined with the OLTE traffic using wavelength add switch 970.

A preferred embodiment of the present invention has been described herein. It is to be understood, of course, that changes and modifications may be made in the embodiment without departing from the true scope of the present invention, as defined by the appended claims.

We claim:

1. An optical fiber protection switch, comprising:
a first set of optical switches connected to two optical rings each comprising a pair of working fiber and protection fiber, the first set of optical switches configured to perform optical ring switching for the pair of working fiber and protection fiber; and
a second set of optical switches operably coupled with the two optical rings through the first set of optical switches, the second set of optical switches configured to perform optical span switching for the two optical rings.

2. The optical fiber protection switch of claim 1 wherein the first set of optical switches includes four 2×2 optical switches.

3. The optical fiber protection switch of claim 1 wherein the second set of optical switches includes four 2×2 optical switches.

4. The optical fiber protection switch of claim 1 wherein the two optical rings comprise a four fiber optical bi-directional line-switched ring.

5. The optical fiber protection switch of claim 1 wherein the optical switches in the second set of optical switches are mechanically-operated.

6. The optical fiber protection switch of claim 1 wherein the second set of optical switches performs the optical span switching responsive to a fiber cut.

7. The optical fiber protection switch of claim 1 wherein the first set of optical switches performs the optical ring switching responsive to a bundle failure.

8. The optical fiber protection switch of claim 1 wherein the second set of optical switches performs automatic span switching responsive to a loss of signal.

9. The optical fiber protection switch of claim 1 further comprising:
a channel manager configured to add wavelengths to optical signals on the two optical rings.

10. The optical fiber protection switch of claim 9 wherein the channel manager is further configured to drop wavelengths from the optical signals.

11. A method of operating an optical fiber protection switch, the optical fiber protection switch is connected to two optical rings each comprising a pair of working fiber and protection fiber, the method comprising:
performing optical ring switching for the pair of working fiber and protection fiber using a first set of optical switches connected to the two optical rings; and
performing optical span switching for the two optical rings using a second set of optical switches operably coupled with the two optical rings through the first set of optical switches.

12. The method of claim 11 wherein the first set of optical switches includes four 2×2 optical switches.

13. The method of claim 11 wherein the second set of optical switches includes four 2×2 optical switches.

14. The method of claim 11 wherein the two optical rings comprise a four fiber optical bi-directional line-switched ring.

15. The method of claim 11 further comprising:
mechanically-operating the second set of optical switches.

16. The method of claim 11 wherein the step of performing span switching comprises:
performing span switching responsive to a fiber cut.

17. The method of claim 11 wherein the step of performing ring switching comprises:
performing ring switching responsive to a bundle failure.

18. The method of claim 11 wherein the step of performing span switching comprises:
automatically performing span switching responsive to a loss of signal.

19. The method of claim 11 further comprising:
adding wavelengths to optical signals on the two optical rings using a channel manager.

20. The method of claim 19 further comprising:
dropping wavelengths from the optical signals using the channel manager.

* * * * *